United States Patent
Cho

[19]

[11] Patent Number: 5,930,454
[45] Date of Patent: Jul. 27, 1999

[54] REFRIGERATOR HAVING AN APPARATUS FOR THAWING FROZEN FOOD

[75] Inventor: Hong-Min Cho, Seoul, Rep. of Korea

[73] Assignee: Daewoo Electronics., Ltd., Seoul, Rep. of Korea

[21] Appl. No.: 08/985,217

[22] Filed: Dec. 4, 1997

[30] Foreign Application Priority Data

Dec. 30, 1996 [KR] Rep. of Korea ..................... 96-76233

[51] Int. Cl.⁶ ............... F24H 3/02; A23C 3/02; F27D 11/00
[52] U.S. Cl. ............... 392/360; 99/483; 165/61; 426/524; 392/371; 392/379; 392/382; 219/385
[58] Field of Search .................... 392/360, 371, 392/379, 382; 219/400, 385; 165/61, 64, 918; 312/236; 426/524; 62/331; 99/483, 474

[56] References Cited

U.S. PATENT DOCUMENTS

| | | | |
|---|---|---|---|
| 2,465,107 | 3/1949 | Mascioli et al. | 426/524 |
| 3,590,911 | 7/1971 | Horvay | 165/64 |
| 3,857,254 | 12/1974 | Lobel | 426/524 |
| 4,385,075 | 5/1983 | Brooks | 426/524 |
| 5,290,510 | 3/1994 | Lee | 99/474 |

FOREIGN PATENT DOCUMENTS

| | | |
|---|---|---|
| 2-115675 | 4/1990 | Japan . |
| 4-68287 | 3/1992 | Japan . |
| 4-244583 | 9/1992 | Japan . |
| 5-79742 | 3/1993 | Japan . |
| 5-141858 | 6/1993 | Japan . |
| 9202460 | 3/1992 | Rep. of Korea . |

*Primary Examiner*—Tu B. Hoang
*Assistant Examiner*—Daniel Robinson
*Attorney, Agent, or Firm*—Jacobson, Price, Holman & stern, PLLC

[57] ABSTRACT

A refrigerator having an apparatus for thawing frozen food includes food case mounted on the lower side of a partition for partitioning cooling compartments from each other, and a heater and a blowing device installed in the partition. The operating time of the heater and the blowing fan is counted in a timer. A user accommodates frozen food in the food case and sets a time for thawing by the timer. Then the frozen food is thawed by the operation of the heater and the blowing device. Thus, the frozen food can be thawed conveniently and rapidly.

3 Claims, 4 Drawing Sheets

REFRIGERATOR HAVING AN APPARATUS FOR THAWING FROZEN FOOD

BACKGROUND OF THE INVENTION

1. Field of the Invention

The present invention relates to a refrigerator, and more particularly to a refrigerator having an apparatus for thawing food which is frozen in a freezing compartment.

2. Prior Art

A refrigerator has a freezing compartment for freezing food and a fresh food compartment for preserving food in fresh state. In general, the fresh food compartment keeps the temperature at about 2 or 3 degrees centigrade, and the freezing compartment keeps from minus 15 to minus 20 degrees centigrade. Food such as meat needs preservation for a long time, so it is generally stored in the freezing compartment.

Since the food stored in the freezing compartment is frozen by the low temperature in the freezing compartment, the food cannot be cooked directly. A user must use an additional thawing means or put the food at room temperature for a long period of time in order to thaw the food which has been stored in the freezing compartment.

SUMMARY OF THE INVENTION

The present invention has been proposed to overcome the above described problems in the prior art, and accordingly it is the object of the present invention to provide a refrigerator having a means for thawing the frozen food in order to make quick use of the food stored in the freezing compartment in cooking.

To achieve the above object, the present invention provides a refrigerator comprising: a food case being mounted on a wall of a cooling compartment, said food case for accommodating frozen food; a means for fixing said food case to be detachable; and a heater for thawing food accommodated in said food case.

Between said heater and said food case, a fan for blowing heat generated from said heater into said food case is disposed.

The heating time of said heater is controlled by a timer.

Preferably, said heater is accommodated in an accommodation recess formed in a partition for partitioning cooling compartments from each other.

Furthermore, a circulation duct for communicating an inner space of said food case with said heater is formed in said partition. Said circulation duct provides a passage through which air blown by said fan circulates toward said heater after thawing the food accommodated in said food case.

According to the present invention, the food frozen at the freezing compartment is rapidly thawed, so it can be used for cooking directly.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENTS

Hereinafter, the present invention will be described in detail with reference to the drawings.

In general, a refrigerator has two cooling compartments. The compartments are comprised of a freezing compartment and a fresh food compartment, and generally the freezing compartment is placed at the upper part of the refrigerator and the fresh food compartment is placed at the lower part of the refrigerator.

Figure 1:
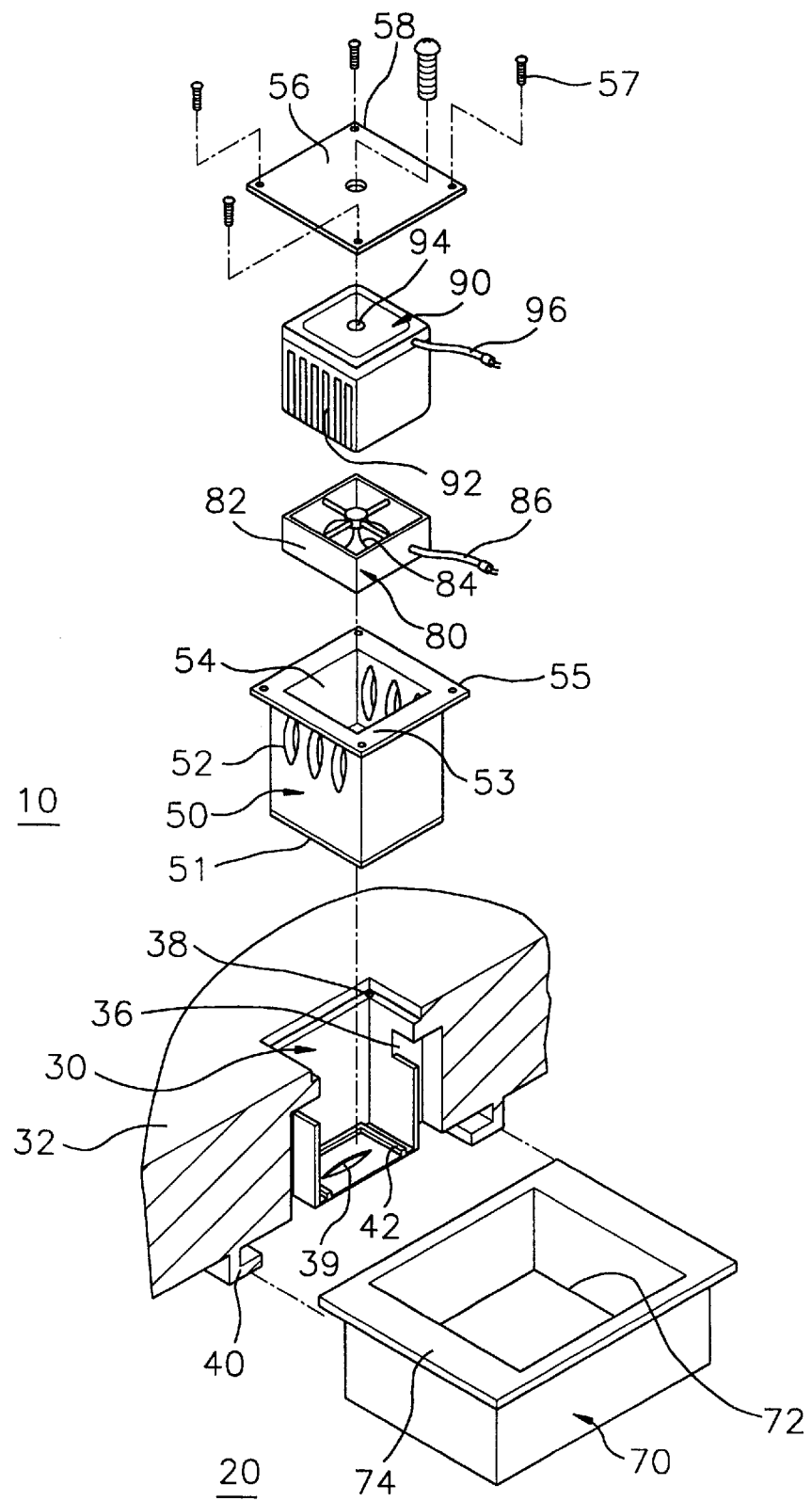
FIG. 1 is an exploded perspective view of a thawing apparatus in a refrigerator according to the present invention.
Figure 2:
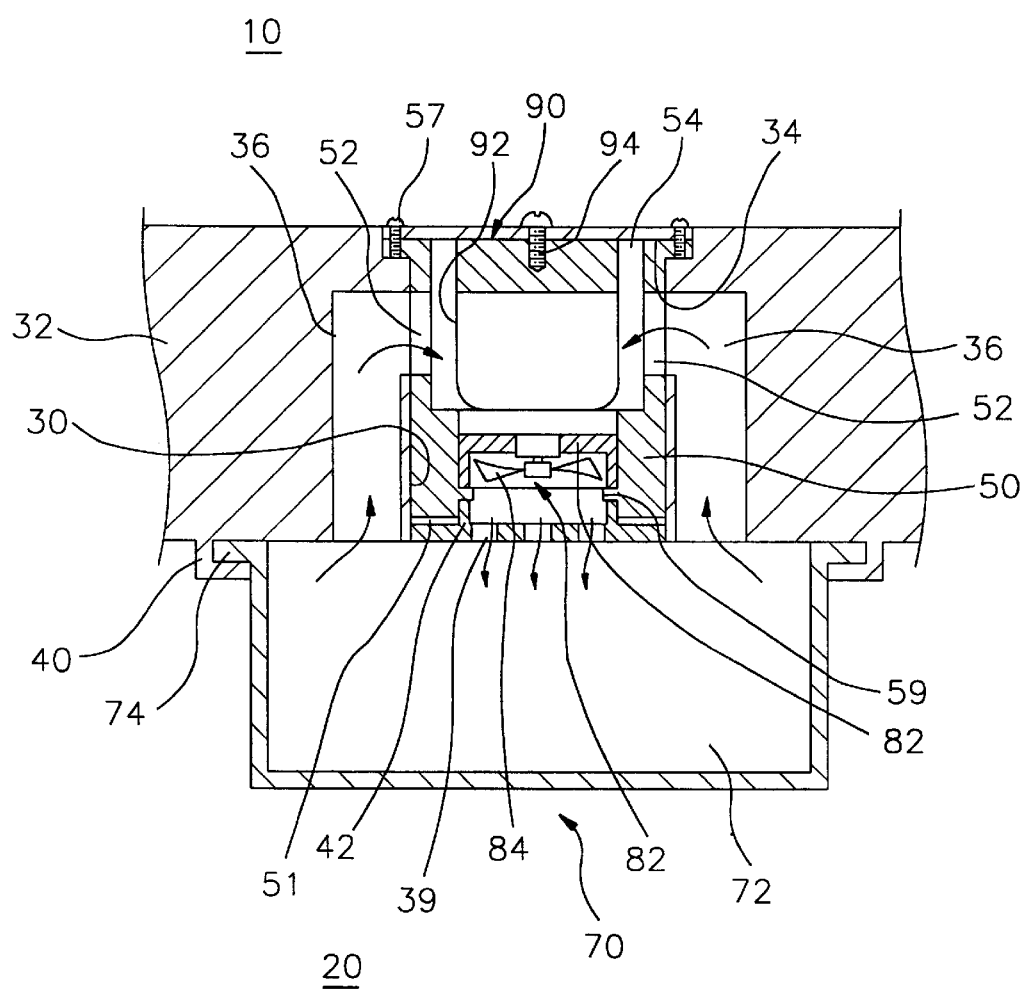
FIG. 2 is a side sectional view of the assembled state of FIG. 1.
Figure 4:
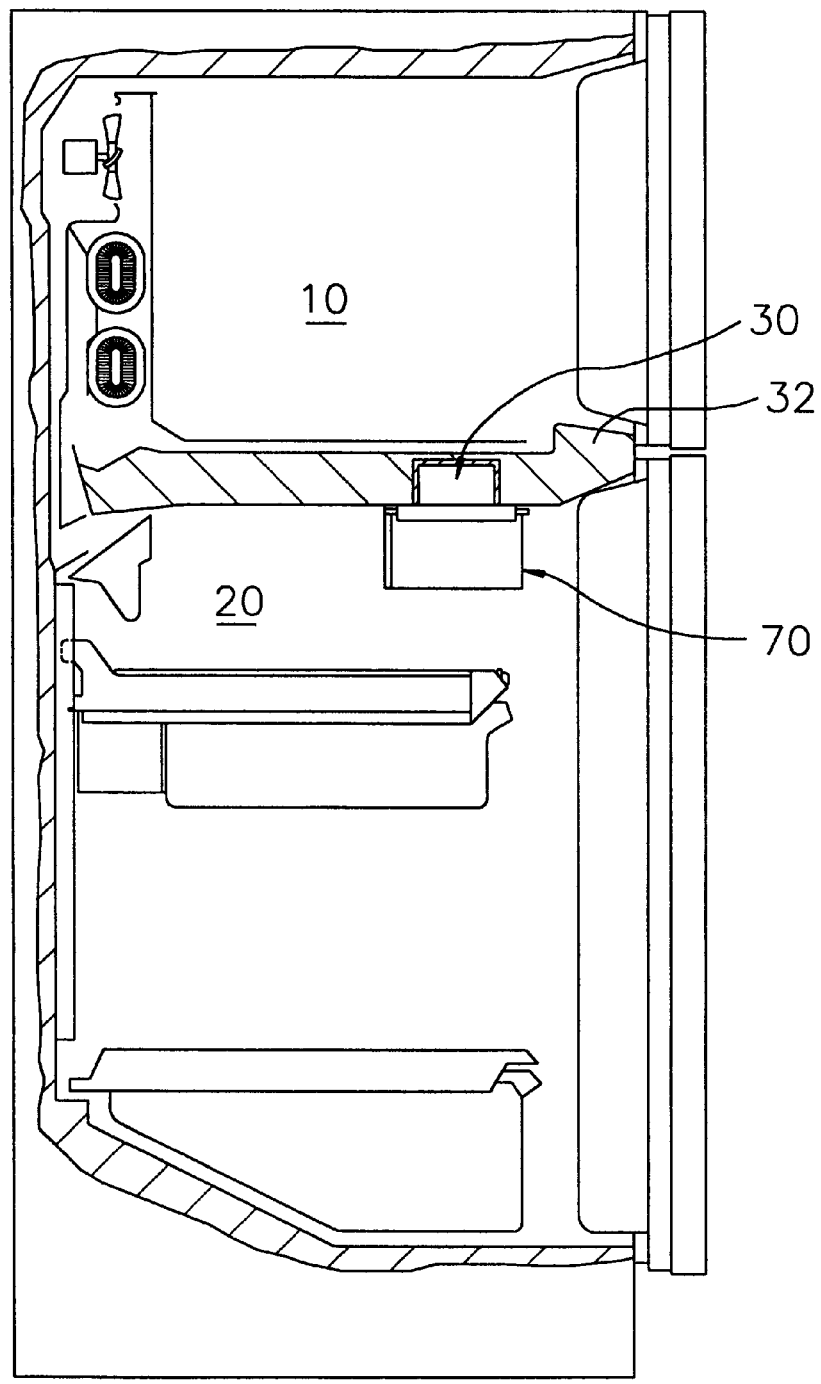
FIG. 4 is a side elevational view of a refrigerator partially broken away to show a thawing apparatus to the present invention.

FIG. 1 is an exploded perspective view of a thawing apparatus in a refrigerator according to the present invention, and FIG. 2 is a side sectional view of the assembled state of FIG. 1. Further, FIG. 4 is a side elevational view of a refrigerator partially broken away to show a thawing apparatus according to the present invention. The freezing compartment 10 and the fresh food compartment 20 are partitioned by a partition 32 from each other. The refrigerator according to the present invention includes a food case 70 which accommodates frozen food and is mounted under the partition 32, a heater 90 for heating the food accommodated in the food case 70, and a blowing device 80 for blowing the heat generated from the heater 90 into the food case 70.

In the food case 70, a space 72 for accommodating the frozen food is formed. On the upper part of the food case is formed a fixing rib 74 for fixing the food case 70 at the partition 32. On the bottom side of the partition 32, a fixing rail 40 for fixing the food case 70 is formed. The fixing rib 74 of the food case 70 is inserted in the fixing rail 40. Thus, the food case 70 is detachably fixed by the fixing rib 47 and the fixing rail 40.

The heater 90 is accommodated in a heater case 50. The heater case 50 has a space 54 for accommodating the heater 90 therein, and the upper and lower side thereof are opened. At the upper part of the heater case 50, a screwing part 53 extended outward is formed, and a plurality of screwing ports 55 are formed at the screwing part.53.

The heater case 50 is covered by a cover 35. The cover 56 is formed with a plurality of screwing ports 58 which correspond to the screwing ports 55 of the heater case 50. The cover 56 is fixed at the heater case 50 by screws 57 which pass through the screwing ports 58 formed at the cover 56 and the screwing ports 55 formed at the heater case 50.

At the sides of the heater case 50, a plurality of air circulating ports 52 are formed. At the lower side of the heater case 50, a sealing member 51 is attached.

At the upper side of the heater 90, a screwing recess 94 to which a screw 57 is screwed is formed. A conductive wire 96 is connected to the heater 90. A plurality of fins 92 for radiating heat are formed at the sides of the heater 90.

The blowing device 80 is comprised of a fan 84 and a frame 82 for supporting the fan 84. A conductive wire 86 is connected to the blowing device 80.

An accommodation recess 30 for accommodating the heater case 50 is formed in the partition 32. At the upper edge part of the accommodation recess 30 is formed a groove 34 by which the screwing part 53 formed at the upper part of the heater case 50 is supported. Fixing recesses 38 for fixing the heater case 50 and the cover 56 are formed at the groove 34. A plurality of discharging ports 39 for discharging heat generated from the heater 90 are formed at the lower side of the accommodation recess 30, and a guide rib 42 for supporting the heater case 50 is formed around the discharging parts 39.

At both sides of the accommodation recess 30, ducts 36 for communicating the accommodation recess 30 and the food case 70 with each other are formed. The ducts 36 provide passage through which air blown by a blowing device 80 circulates toward the heater 90 after thawing the food accommodated in the food case 70.

At the lower inner periphery of the heater case 50, a supporting rib 59 protrudes inward. The supporting rib 59 is supported on the guide rib 42 when the heater case 50 is accommodated in the accommodation recess 30. The supporting rib 59 supports the frame 82 of the blowing device 80 accommodated in the heater case 50

Figure 3:
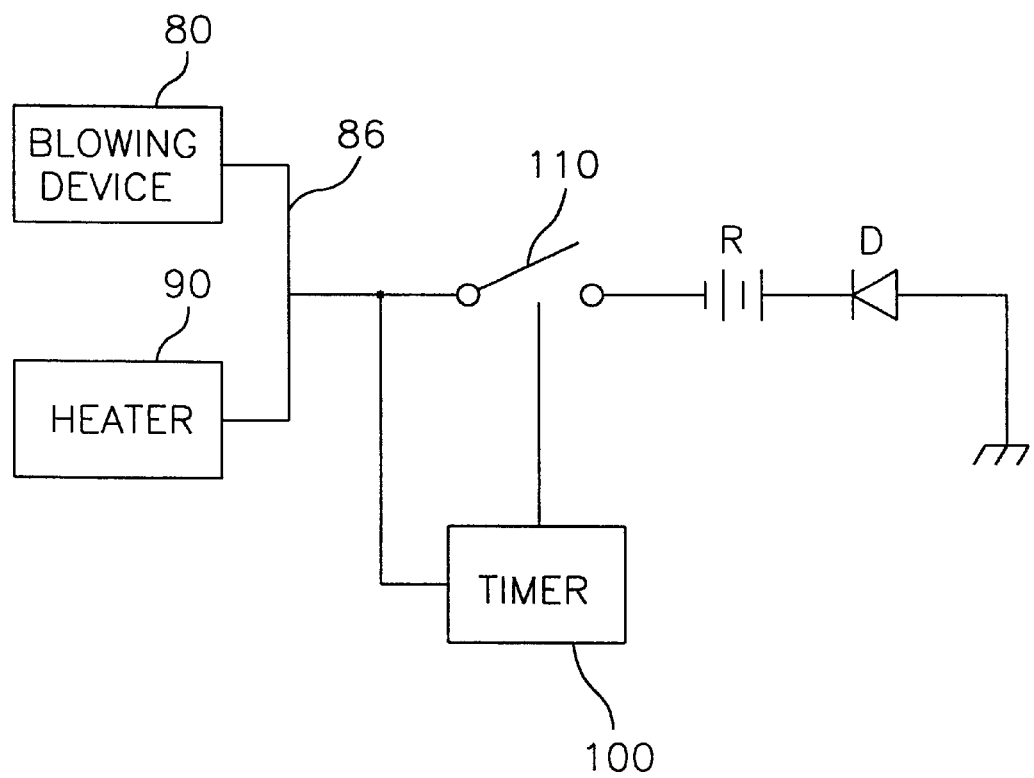
FIG. 3 is a circuit diagram for controlling the heater.

FIG. 3 shows a circuit diagram for controlling the heater 90. The conductive wire 86 of the blowing device 80 and the conductive wire 96 of the heater 90 is connected to a switch 110, and the switch 110 is connected to a timer 100. The time required in thawing the frozen food is set in the timer 100. Preferably, the time is set by the user. When the user closes the switch 110, the blowing device 80 and the heater 90 are supplied with electric power, whereby the blowing device 80 and the heater 90 begin to operate. The operating time of the blowing device 80 and the heater 90 is counted by the timer 100. When the counted time reaches the time set by the user, the switch 110 is opened by the timer 100. Thus the blowing device 80 and the heater 90 stop operating.

Hereinbelow, the operation and effect of the refrigerator according to the present invention having such a constitution will be described.

The frozen food is accommodated in the food case 70, and thereafter the food case 70 is fixed at the fixing rail 40, whereby the food case 70 is mounted under the partition 32. When the user sets a time to the timer 100 and then closes switch 110, the blowing device 80 and the heater 90 begin to operate. Therefore, the food accommodated in the food case 70 is thawed.

The heat blown by the fan 84 of the blowing device 80 is cooled during the thawing of the food. The cooled air circulates through the ducts 36, and then reaches the heater 90 through the air circulating ports 52 of the heater case 50. The circulated air is heated again by the heater 90, and then is blown again into the food case 70 by the blowing device 80.

When the time set in the timer 100 passes, the switch 110 is opened, and the blowing device 80 and the heater 90 stop operating. The thawing operation then is ended. The user can proceed to cook the thawed food.

As described above, according to the present invention, since the refrigerator has the thawing apparatus, the frozen food in the freezing compartment 10 can be thawed conveniently and rapidly.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. A refrigerator comprising:

a food case mounted on a partition for partitioning cooling compartments from each other, said food case adapted to accommodate frozen food;

a means for fixing said food case to be detachable from said partition;

a heater installed in an accommodation recess formed in said partition, said heater adapted to thaw food accommodated in said food case;

a fan disposed vertically between said heater and said food case and adapted to blow heat generated from said heater into said food case;

a circulation duct formed in said partition, said circulation duct communicating an inner space of said food case with a plurality of heat-radiating fins formed on each side of said heater, said circulation duct providing a passage through which air blown by said fan circulates toward said heater after thawing the food accommodated in said food case; and a timer for controlling heating time of said heater.

2. The refrigerator as claimed in claim 1, wherein said heater is accommodated in a heater case housed in said accommodating recess, and a plurality of air circulating ports are formed at sides of said heater case, and a plurality of discharging ports are formed at a lower side of said accommodating recess.

3. The refrigerator as claimed in claim 2, wherein said air circulating ports closedly face to said heat-radiating fins.

* * * * *